Patented Sept. 3, 1929.

1,726,646

UNITED STATES PATENT OFFICE.

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT.

SUBSTITUTED DITHIOCARBAMATES AND METHOD OF MAKING SAME.

No Drawing.   Application filed March 2, 1928.   Serial No. 258,671.

This invention relates to a new class of products and to a method of making them.

The new products may be generally termed the poly-nitrophenyl disubstituted dithiocarbamates. They may be made by treating a solution of a salt of a disubstituted dithiocarbamate with a solution of a dinitro chlor benzol. They may also be prepared by treating a solution of a secondary amine with carbon disulphide and sodium hydroxide solution, and then treating this reaction mixture, which contains the sodium salt of the substituted dithiocarbamate, with an equal molecular amount of a dinitro chlor benzol in solution. The corresponding dinitro phenyl disubstituted dithiocarbamate separates out on cooling and may be recrystallized from alcohol.

*2-4 dinitrophenyl dimethyl dithiocarba-* *mate.*—196 pounds of 23% dimethylamine solution (or an equivalent amount of approximately the same strength) is treated with 80 pounds of carbon disulphide in a closed system provided with a means of cooling the reaction mixture. 160 pounds of 23% sodium hydroxide is added using the same closed system and cooling. Good agitation is desirable for these operations. The solution is filtered from the excess carbon disulphide or other extraneous matter and constitutes an aqueous solution of sodium dimethyl dithiocarbamate. 202 pounds of 2.4 dinitrochlor benzol is dissolved by adding 1188 pounds (82% by weight) of denatured alcohol at about 104° F. The solution of the sodium salt of dimethyl dithiocarbamate is run into the alcoholic solution of dinitrochlor benzol in the course of about 45'. During the addition, the temperature of the reaction mixture should be maintained at about 104° F. and the mixture should be well agitated. The stirring is continued for about an hour at this same temperature. The mixture is then cooled to room temperature and filtered. The residue is washed with water and dried at 150° F. The material should melt at 135 to 140° C. and the commercially prepared compound as suggested above may be purified and re-crystallization from alcohol or acetone.

The 2-4 dinitrophenyl dimethyl dithiocarbamate is believed to have the formula—

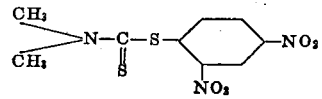

Its melting point is 151–152° uncorrected. It is a yellow compound which crystallizes in needles, insoluble in water, soluble in hot alcohol, slightly soluble in cold alcohol, readily soluble in both benzol and acetone. When re-crystallized from alcohol the melting point is approximately 142° uncorrected. If recrystallized from acetone or benzol the melting point rises to 151–152° C. uncorrected. The compound may be obtained according to the above method in yields of 95% or greater. It gives upon analysis the following figures for sulphur and nitrogen:

|  | Found | Calculated |
|---|---|---|
| Sulphur | 21.8 | 22.3 |
| Nitrogen | 13.3 | 14.6 |

*2-4 dinitrophenyl diethyl dithiocarbamate.*—Which is believed to have the formula—

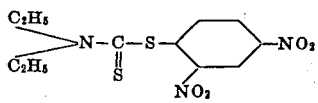

73 grams of diethylamine are dissolved in 500 cc. of alcohol. 76 grams of carbon disulphide are added to this solution, the mixture being kept cold throughout. Afterwards 40 grams of sodium hydroxide dissolved in the smallest quantity of water possible are added to the above solution, the whole mixture being kept cold as possible. 202½ grams of 1 chlor 2,4 dinitro benzol are then added to the solution as above prepared and the whole is then heated to 50 or 60° C. for ¾ of an hour. The reaction mixture is then cooled whereupon the product which is the 2,4 dinitrophenyl diethyl dithiocarbamate separates out in crystalline form. It is filtered from the alcohol and washed free of sodium chloride.

*2-4 dinitro phenyl diiso propyl dithiocarbamate.*—Which is believed to have the formula—

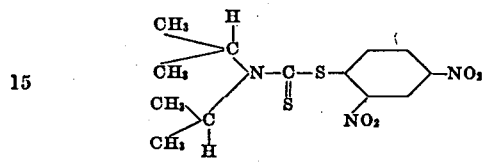

101 grams of diisopropylamine are dissolved in 500 cc. of alcohol. To this solution 76 grams of carbon bisulphide are added, the reaction mixture being kept cold throughout. 40 grams of caustic soda dissolved in the smallest possible amount of water are then added to the above solution. The solution then contains sodium diisopropyl dithiocarbamate. Thereupon 202½ grams of 1 chlor 2,4 dinitrobenzol are added to the solution and the whole heated to 50 to 60° C. for ¾ of an hour. The reaction mixture is then cooled to room temperature whereupon the product which is the 2,4 dinitrophenyl diisopropyl dithiocarbamate crystallizes out. It is filtered from the solution and washed free from sodium chloride.

*2-4 dinitrophenyl dicyclohexyl dithiocarbamate.*—Which is believed to have the formula—

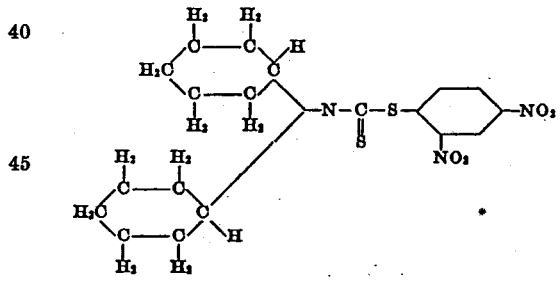

76 grams of carbon disulphide are added to 362 grams of dicyclohexylamine dissolved in alcohol slowly and with cooling. When this reaction is completed 76 grams of carbon disulphide are added and 80 grams of sodium hydroxide in aqueous solution is added slowly and with cooling. To the resulting alcoholic solution of sodium dicyclohexyl dithiocarbamate are added 405 grams of 2,4 dinitrochlorbenzol dissolved in alcohol. The 2,4 dinitrophenyl dicyclohexyl dithiocarbamate separates out as a solid. This is recrystallized from alcohol giving a compound melting at 127° C.

The following compounds have been prepared, isolated and and identified in the above described manner.

| | | |
|---|---|---|
| 2,4 dinitrophenyl diethyl dithiocarbamate | m.p after recryst. from alcohol. | 81° C. (uncorrected) |
| 2,4 dinitrophenyl dinormal propyl dithiocarbamate | m.p after recryst. from alcohol. | 84° C. (uncorrected) |
| 2,4 dinitrophenyl diisopropyl dithiocarbamate | m.p after recryst. from alcohol. | 117° C. (uncorrected) |
| 2,4 dinitrophenyl dinormal butyl dithiocarbamate | m.p after recryst. from alcohol. | an oil (uncorrected) |
| 2,4 dinitrophenyl diisobutyl dithiocarbamate | m.p after recryst. from alcohol. | 85° C. (uncorrected) |
| 2,4 dinitrophenyl diallyl dithiocarbamate | | an oil |
| 2,4 dinitrophenyl dibenzyl dithiocarbamate | m.p after recryst. from alcohol. | 106° C. (uncorrected) |
| 2,4 dinitrophenyl diisoamyl dithiocarbamate | m.p after recryst. from alcohol. | 52–54° C. |
| 2,4 dinitrophenyl morpholyl dithiocarbamate | m.p after recryst. from alcohol. | 125–130° C. |
| (2,4 dinitrophenyl anhydro hydroxylethyl dithiocarbamate) | | |
| 2,4 dinitrophenyl dicyclohexyl dithiocarbamate | m.p after recryst. from alcohol. | 127° C. |

All of these compounds are insoluble in water, soluble in benzol, acetone, hot alcohol, and slightly soluble in cold alcohol.

At the present time one utility of the above new compounds is in connection with the vulcanization of rubber, for which all of them are accelerators.

Having thus described my invention, what I claim and desire to protect by Letters Patent is:

1. As new compounds the polynitro aryl dialkyl dithiocarbamates.

2. As new compounds the polynitrophenyl dialkyl dithiocarbamates.

3. As new compounds the dinitrophenyl disubstituted dithiocarbamates.

4. As new compounds the dinitroaryl dialkyl dithiocarbamates.

5. As new compounds the dinitrophenyl dialkyl dithiocarbamates.

6. As new compounds the 2-4 dinitrophenyl disubstituted dithiocarbamates.

7. As new compounds the 2-4 dinitrophenyl dialkyl dithiocarbamates.

8. 2-4 dinitrophenyl dimethyl dithiocarbamates.

9. A method of making poly nitrophenyl derivatives of disubstituted dithiocarbamates which comprises treating a solution of a salt of a disubstituted dithiocarbamate with a solution of a polynitrochlor benzol, and separating the reaction product, poly nitrophenyl disubstituted dithiocarbamate, having the nitro groups joined to the benzene nucleus as in the aforesaid polynitrochlor benzol.

10. A method of making dinitrophenyl derivatives of disubstituted dithiocarbamates which comprises treating a solution of a salt of a disubstituted dithiocarbamate with a solution of a dinitrochlor benzol, and separating the reaction product, dinitrophenyl disubstituted dithiocarbamate, having the nitro groups joined to the benzene nucleus as in the aforesaid dinitro-chlor benzol.

11. A method of making nitro derivatives of dialkyl dithiocarbamates which comprises treating a solution of a salt of a dialkyl dithiocarbamate with a solution of a dinitro chlor benzol, and separating the reaction product, dinitro-phenyl dialkyl dithiocarbamate, having the nitro groups joined to the benzene nucleus as in the aforesaid dinitrochlor benzol.

12. A method of making 2-4 dinitrophenyl derivatives of dialkyl substituted dithiocarbamates which comprises treating a solution of a salt of a dialkyl substituted dithiocarbamate with a solution of 2-4 dinitrochlor benzol, and separating the reaction product, 2-4 dinitrophenyl dialkyl disubstituted dithiocarbamate.

13. A method of making 2-4 dinitrophenyl derivatives of dimethyl substituted dithiocarbamates which comprises treating a solution of a salt of a dimethyl substituted dithiocarbamate with a solution of 2-4 dinitrochlor benzol, and separating the reaction product, 2-4 dinitrophenyl dimethyl disubstituted dithiocarbamate.

14. A method of making dinitrophenyl dialkyl dithiocarbamates which comprises agitating a reaction mixture of a dialkyl amine, carbon disulphide and sodium hydroxide solution with a solution of a dinitro chlor benzol, and separating the reaction product, dinitrophenyl dialkyl dithiocarbamate from the reaction mixture.

15. A method of making dinitrophenyl dialkyl dithiocarbamates which comprises agitating a water solution of a dialkyl dithiocarbamate with a solution of a dinitro chlor benzol at approximately 104° C., cooling, separating and purifying the reaction product, dinitrophenyl dialkyl dithiocarbamate.

16. A method of making 2-4 dinitrophenyl dialkyl dithiocarbamates which comprises agitating a water solution of a dialkyl dithiocarbamate with a solution of a 2-4 dinitrochlor benzol at approximately 104° C., cooling, separating and purifying the reaction product, 2-4 dinitrophenyl dialkyl dithiocarbamate.

17. A method of making 2-4 dinitrophenyl dialkyl dithiocarbamates which comprises agitating the reaction mixture of dimethyl amine, carbon disulphide and aqueous sodium hydroxide with an equal molecular weight of 2-4 dinitrochlor benzol in solution at approximately 104° C., cooling, separating the 2-4 dinitrophenyl dimethyl dithiocarbamate from the reaction mixture, and purifying by recrystallization.

Signed at New York, county and State of New York, this 21st day of February, 1928.

SIDNEY M. CADWELL.